United States Patent
Yee

(10) Patent No.: US 7,531,949 B2
(45) Date of Patent: May 12, 2009

(54) ADVANCED COOLING FOR AN INTERACTIVE DISPLAY

(75) Inventor: Dawson Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 11/204,863

(22) Filed: Aug. 15, 2005

(65) Prior Publication Data

US 2007/0035224 A1    Feb. 15, 2007

(51) Int. Cl.
     *H01K 1/58*      (2006.01)
     *H01J 1/02*      (2006.01)
     *H05J 7/20*      (2006.01)

(52) U.S. Cl. ............................ 313/46; 313/47; 361/700; 361/704

(58) Field of Classification Search .................. 313/46, 313/18–19, 25, 47, 635; 353/54; 361/688–689, 361/699–700, 704
See application file for complete search history.

(56) References Cited

U.S. PATENT DOCUMENTS

| | | | |
|---|---|---|---|
| 6,784,601 B2 * | 8/2004 | Kai et al. | 313/46 |
| 7,175,309 B2 * | 2/2007 | Craw et al. | 362/253 |
| 2004/0257538 A1 * | 12/2004 | Kondo et al. | 353/54 |
| 2006/0044524 A1 * | 3/2006 | Feliss et al. | 353/54 |

\* cited by examiner

*Primary Examiner*—Nimeshkumar D. Patel
*Assistant Examiner*—Anne M Hines
(74) *Attorney, Agent, or Firm*—Workman Nydegger

(57) ABSTRACT

A thermally stabilized lamp assembly that can be de-energized without continuing to provide moving air for cooling purposes. The assembly includes an arc lamp bulb having a base and a reflector. A heat pipe containing a thermally conductive fluid is configured for thermal communication with the arc lamp base. A heat dissipation assembly is coupled in fluid communication with the heat pipe to dissipate heat produced by the lamp into the ambient environment, thereby cooling the lamp both before and after the lamp is de-energized. Accordingly, it is not necessary to provide moving air to cool the arc lamp after it is de-energized.

18 Claims, 3 Drawing Sheets

ADVANCED COOLING FOR AN INTERACTIVE DISPLAY

BACKGROUND

Presently, there are a wide variety of projection technologies available in the marketplace. For example, overhead projectors, front projection televisions and rear projection televisions each employ projector technologies. Current projection systems frequently employ a high-output arc lamp to provide as an illumination source. Arc lamps are known to generate significant levels of waste heat while operating, producing surface temperature differentials of several hundred degrees Fahrenheit on various portions of the lamp. Additionally, a lamp housing that typically encloses such a lamp can also reach temperatures of many hundred degrees during operation of the lamp. Consequently, most projection systems incorporate a fan to provide forced convective cooling of the arc lamp and the lamp housing. However, the significant temperatures involved frequently require that the fan continue to run for a period of time after the lamp has been de-energized in order to dissipate heat retained in the lamp and lamp housing, both to preserve the lamp and to protect other parts of the projection system from thermal stress.

Clearly, the need to provide forced-air convective cooling of the lamp and its assembly after the lamp has been de-energized will mandate that the projection system then continue to provide electrical power to the fan motor. However, if power to a projection system is interrupted by a power outage or a tripped circuit breaker, or by someone inadvertently pulling the power cord from a line power socket, damage to the projection system due to excessive heat build up is possible. Furthermore, operation of the fan often significantly increases the ambient noise level, which is very apparent and undesirable when the projection system is used in a quiet environment. Therefore, a projection system that allows instant interruption of electrical power without risking thermal damage to the lamp or other components of the projector system would be of particular interest.

SUMMARY

Several implementations of an interactive display are described below in detail. One such implementation includes a housing having within it a lamp and a thermal management assembly. In one exemplary embodiment described below, the lamp has a main body portion coupled to a stem portion. The stem portion can include an electrical interface at one end. A second end of the stem portion can be coupled to the main body portion. As described below, the thermal management assembly can include a heat pipe coupled to a remote heat sink. The heat pipe described in one implementation is a hollow member containing a thermally conductive fluid. The heat pipe can be disposed near the stem portion of the lamp to conduct heat away from the stem portion and to the remote heat sink assembly.

Another exemplary embodiment described below includes a thermally stabilized lamp assembly that can be de-energized without continuing to provide moving air for cooling purposes. This version includes an arc lamp bulb having a base and a reflector. A heat pipe that contains a thermally conductive fluid is configured for thermal communication with the arc lamp base. Also described in this embodiment is a heat dissipation assembly that is in fluid communication with the heat pipe and which is configured to dissipate heat produced by the lamp when the lamp is energized, so that the arc lamp bulb can de-energized, without the need to provide moving air to cool the arc lamp.

Yet another exemplary implementation described below includes a method for enabling an illumination source to be de-energized without providing moving air to cool the illumination source after it has been de-energized. This implementation provides a heat tube in thermal communication with the illumination source and circulates a thermally conductive medium through the heat tube to transfer waste heat from the illumination source to an ambient environment.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. Furthermore, it should be understood in the following description and claims that when lists of alternatives are offered using the conjunctive form "and" that what is meant is "and/or."

Figure 1:
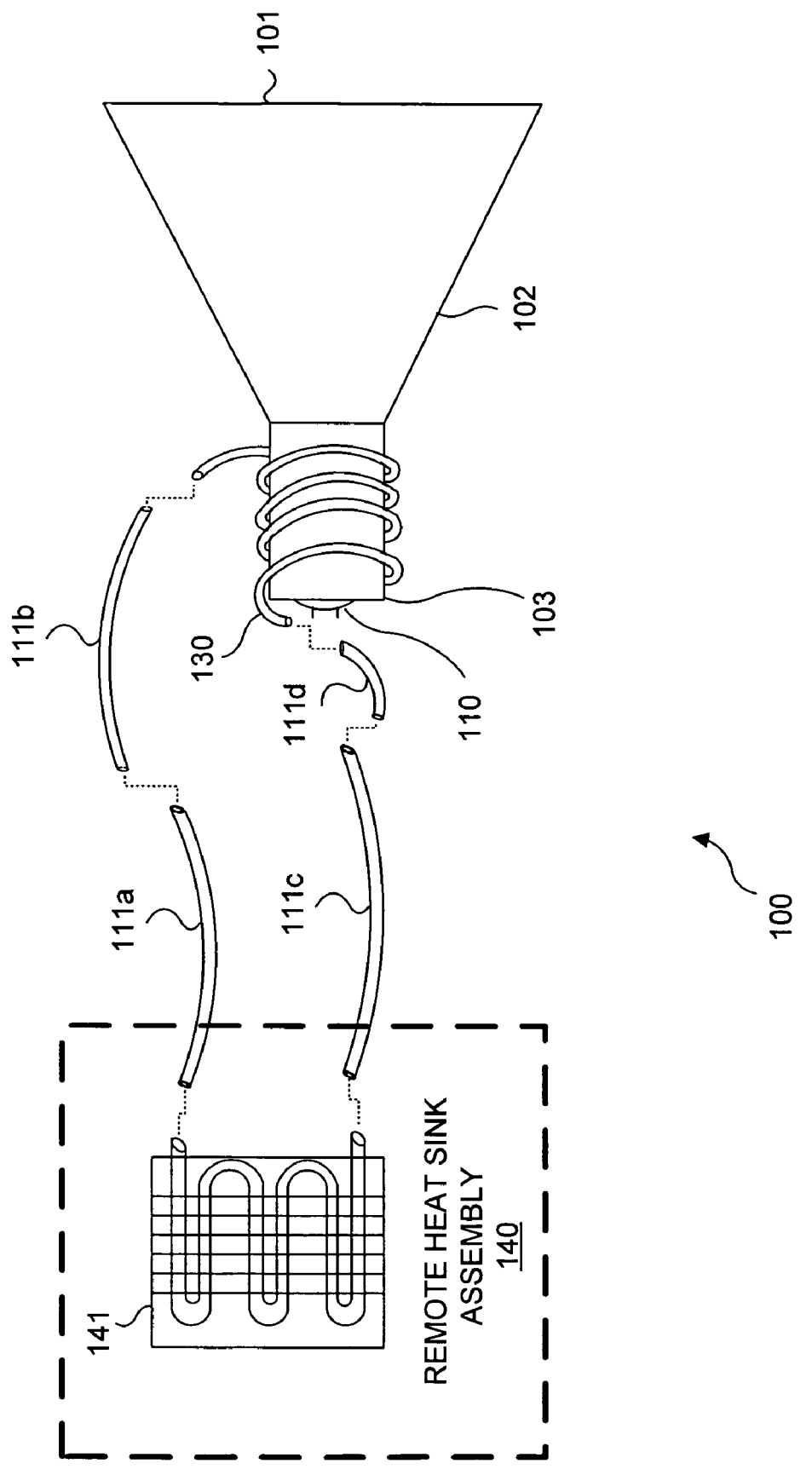
FIG. 1 is a schematic diagram illustrating an exemplary thermally managed lamp assembly.

FIG. 1 is a schematic diagram illustrating an exemplary thermally managed lamp assembly 100. As depicted in FIG. 1, lamp assembly 100 includes a lamp 101 having a main body portion 102 and a stem portion 103. One end of stem portion 103 is shown coupled to main body portion 102, while the other end of stem portion 103 is shown having an electrical connection 110. Electrical connection 110 can be any electrical interface suitable for coupling electrical power to lamp 101. A heat tube 130 is shown in FIG. 1 as being helically coiled around a portion of the stem portion 103. However heat tube 130 can be positioned proximate to stem portion 103 in any suitable manner that provides thermal communication between stem portion 103 and heat tube 130. The heat tube can contain a thermally conductive fluid to provide heat flow away from a heat source. A remote heat sink assembly 140 is shown as including a heat dissipation device 141. The heat tube 130 can be optionally be coupled to the remote heat sink assembly 140 via additional segments of pipe material, as illustrated in FIG. 1, for example, by segments 111a, 111b, 111c, and 111d. Segments 111a-111d can be any material suitable for coupling heat pipe 132 to remote heat sink assembly 140 so as to provide a fluid path for the fluid contained within the heat pipe.

Lamp 101 can be any high intensity type, such as an arc lamp. Generally, stem portion 103 of lamp 101 is made of a heatproof material, such as heat-proof glass or a ceramic. Heat tube 130 is generally a hollow elongate member and can have any cross-sectional geometry such as for example round or square, depending on the application. Heat tube 130 can be made of any suitable material such as copper, aluminum, steel, carbon composite, ceramic, or various heat-tolerant polymers. In one implementation, heat tube 130 is a closed-circuit fluid-filled pipe that serves as a heat exchanger. The thermally conductive fluid contained in the heat tube 130 can be any suitable thermal carrier such as water, various alcohols, toluene, acetone, phenol, ammonia, and halide salts. In general, the thermally conductive fluid is selected based upon the range of temperatures at which the lamp will operate in order to maximize heat flow through heat tube 130. Remote heat sink assembly 140 can include one or more heat dissipation devices, such as a condenser, a finned heat sink, a heat exchanger, and/or a fan.

In one implementation, the thermally conductive fluid contained in heat tube 130 is caused by convective movement to circulate within the portion of the heat tube that is in proximity to the stem portion 103 of the lamp 101, thereby causing heat flow from stem portion 103 to remote heat sink assembly 140 as the circulating fluid vaporizes in the part of the heat tube adjacent to stem portion 103 and condenses within remote heat sink assembly 140.

Figure 2:
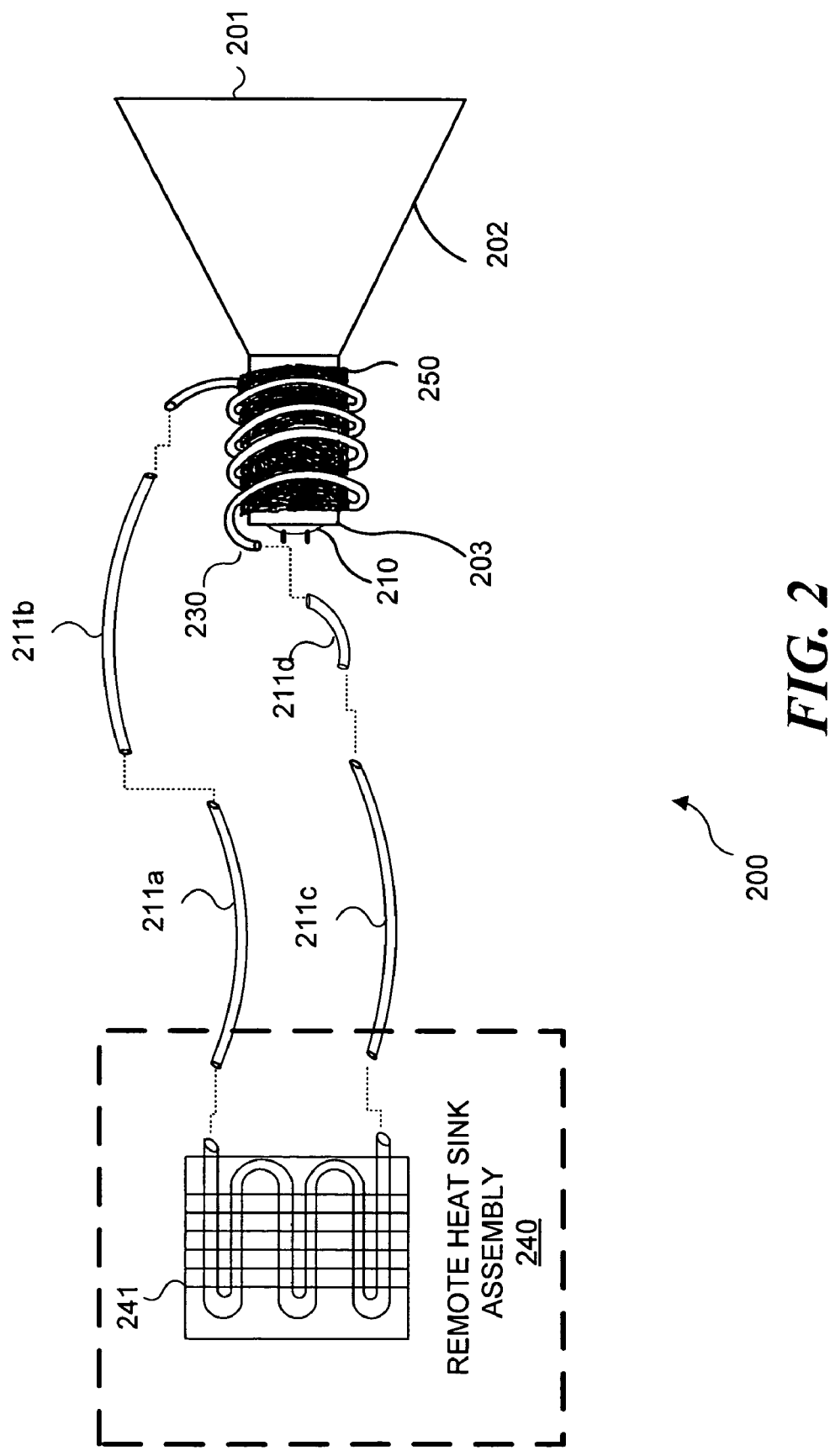
FIG. 2 is a second schematic diagram illustrating another exemplary thermally managed lamp assembly.

FIG. 2 is a second schematic diagram illustrating another exemplary thermally managed lamp assembly. As depicted in FIG. 2, a lamp assembly 200 again includes a lamp 201 having a main body portion 202 and a stem portion 203. One end of stem portion 203 is shown coupled to main body portion 202, while the other end of stem portion 203 is again shown having an appropriate electrical connection 210 suitable for coupling electrical power to lamp 201. A heat tube 230 shown in FIG. 2 is helically coiled around a portion of stem portion 203. As described above with reference to FIG. 1, heat tube 230 can be positioned proximate to stem portion 203 in any manner that provides thermal communication between stem portion 203 and heat tube 230. However, FIG. 2 shows the addition of a thermally conductive gap-filling material 250 positioned to enhance heat transfer between heat tube 230 and stem portion 203. Thermally conductive gap-filling material 250 can be any material suitable for enhancing heat transfer such as silicone elastomers and/or polymers, which may include various fill materials, such as ceramic particles, graphite particles, and structural backing materials, such as aluminum, fiberglass, and copper. Thermally conductive gap fillers are known in the art, and a skilled practitioner will recognize that other equivalents can be added to the above list, which is clearly not intended to be limiting. Thermally conductive gap-filling material 250 can be disposed in any manner that enhances heat transfer between stem portion 203 and heat tube 230. In one implementation, gap filling material 250 is wrapped around stem portion 203, and heat tube 230 is helically wrapped around stem portion 203 so that the heat tube is in contact with gap-filling material 250.

As described above, the heat tube can contain a thermally conductive fluid to facilitate heat flow away from a heat source. A remote heat sink assembly 240 is shown as including a heat dissipation device 241. Heat tube 230 can be coupled to remote heat sink assembly 240 via additional segments of pipe material, as illustrated in FIG. 2 by exemplary segments 211a-211d. Segments 211a-211d can be any material suitable for coupling heat pipe 230 to remote heat sink assembly 240.

As also described above, lamp 201 can be any high intensity illuminant type, such as an arc lamp. Generally, stem portion 203 of lamp 201 is made of a heatproof material such as a ceramic. Heat tube 230 can be made of any suitable material, such as copper, aluminum, steel, carbon composite, ceramic, or various heat-tolerant polymers. In one implementation, heat tube 230 is a closed-circuit fluid filled pipe that functions as a heat exchanger. The thermally conductive fluid contained in heat tube 230 can be any suitable thermal carrier, such as water, various alcohols, toluene, acetone, phenol, ammonia, and halide salts. In general, the thermally conductive fluid is selected based upon the range of temperatures at which the lamp will operate in order to maximize heat dissipation through heat tube 230. Remote heat sink assembly 240 can include one or more heat dissipation devices, such as, a condenser, a finned heat sink, a heat exchanger, and/or a fan.

In one implementation, the thermally conductive fluid contained in heat tube 230 is caused to circulate within the heat tube in proximity to stem portion 203 of lamp 201, and aided by thermally conductive gap-filler material 250, causes heat flow from stem portion 103 to remote heat sink assembly 240, as the circulating fluid vaporizes at the stem portion of the lamp and condenses within the remote heat sink assembly with which heat tube 230 is coupled in fluid communication.

Figure 3:
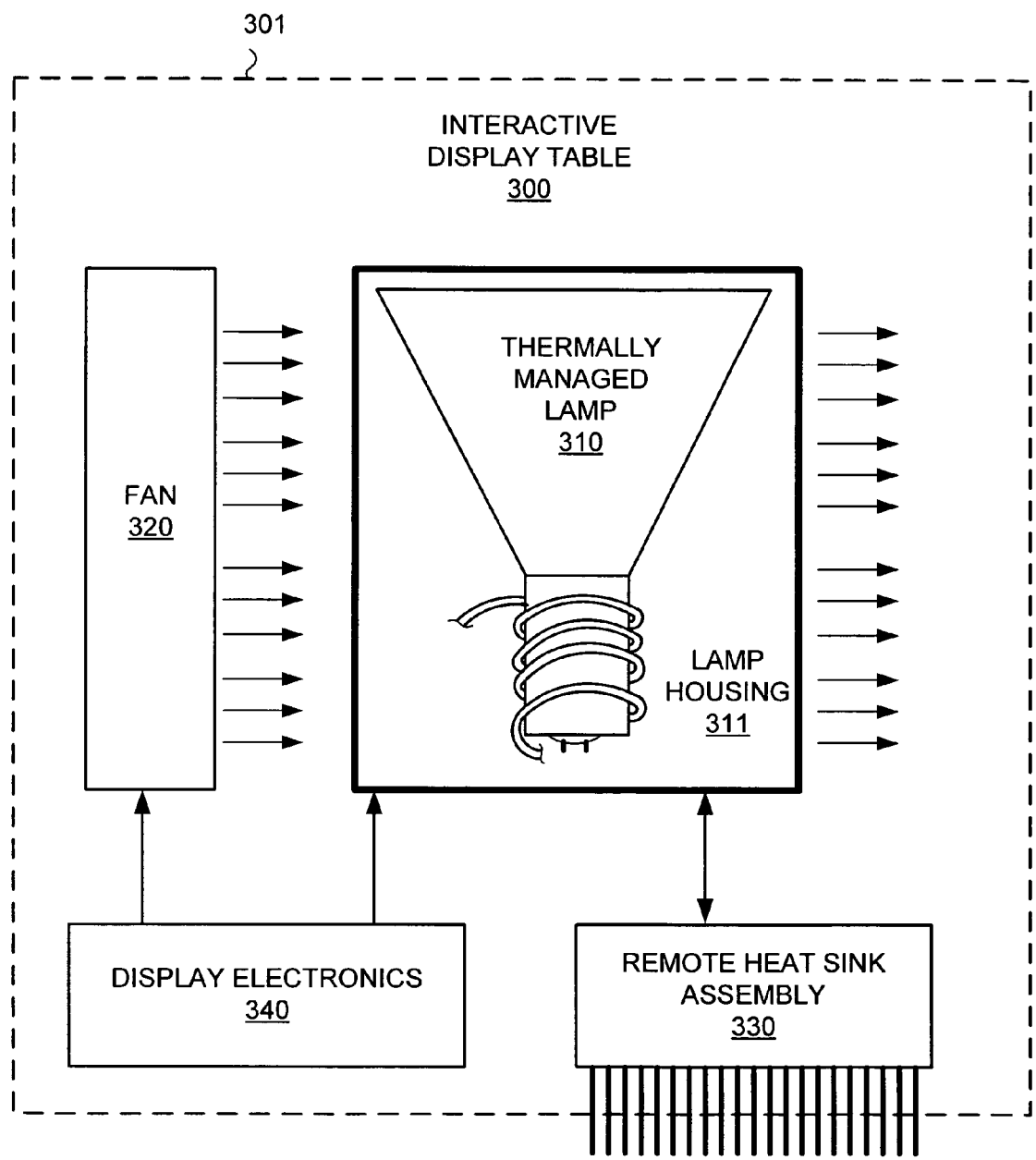
FIG. 3 is a schematic diagram illustrating an exemplary interactive display table incorporating a thermally managed lamp assembly.

FIG. 3 is a schematic diagram illustrating an exemplary interactive display table 300 incorporating a thermally managed lamp assembly. Interactive display table 300 is shown having a housing 301 that includes a thermally managed lamp 310 within a lamp housing 311, a fan 320, a remote heat sink assembly 330, and display electronics 340. Thermally managed lamp 310 is shown in thermal communication with remote heat sink assembly 330 (through a heat pipe, as explained above). A fan 320 and a thermally managed lamp 310 are shown in electrical communication with display electronics 340. FIG. 3 illustrates that fan 320 is configured to provide forced conductive cooling to lamp housing 311 and thermally managed lamp 310. In one implementation, fan 320 is operative to provide forced conductive cooling only when thermally managed lamp 310 is energized. In another implementation, a lamp housing 311 is made of heat resistant ceramic material. In yet another implementation lamp housing 311 is made of a composite material such as a plastic or polymer material embedded with glass fiber or carbon fiber matrix material.

Thermally managed lamp 310 and remote heat sink assembly 330 are operative together to form a thermally managed lamp assembly, as described above in reference to FIGS. 1 and 2. Accordingly, one implementation of interactive display table 300 includes thermally managed lamp assembly 100, and other components discussed above with reference to FIG. 1. Another implementation of interactive display table 300 includes thermally managed lamp assembly 200, and other components discussed above with reference to FIG. 2. In general, remote heat sink assembly 330 can be physically spaced apart from display electronics 340 to further thermally stabilize and thermally isolate the heat sensitive components of interactive display table 300. Also, additional thermal insulation (not shown) can be included in interactive display table 300 to further isolate sensitive components such as display electronics 340 from waste heat. In one implementation, remote heat sink assembly 330 includes a finned heat sink (i.e., a radiator) that is thermally coupled to an ambient environment outside of the interactive display table housing 301.

In operation, the thermally managed lamp assembly (as described above) of interactive display table 300 removes heat from thermally managed lamp 310 while the lamp is in operation and after lamp 310 has been de-energized, thereby allowing power to be removed from fan 320 immediately upon de-energizing the lamp, without damage to the lamp or other components occurring because of heat build-up. Such damage is avoided due to the thermal isolation provided by insulation and through heat transfer away from the lamp assembly via a heat pipe as discussed above.

Another aspect of this technology is directed to an exemplary method for enabling an illumination source to be de-energized without providing moving air to cool the illumination source after it has been de-energized. A first step of the method includes the step of providing a heat tube in thermal communication with the illumination source. A thermally conductive medium is then circulated by natural convection through the heat tube to transfer waste heat from the illumination source to an ambient environment. One implementation includes the additional step of increasing thermal conductivity between the heat tube and the illumination source using a thermally conductive gap filler that is disposed between the illumination source and the heat tube. Another implementation includes the additional step of conveying the thermally conductive fluid to a remote heat dissipation device that is in thermal communication with the ambient environment. Still another implementation includes the additional step of positioning the remote heat dissipation device in order to maximize thermal communication away from the illumination source and into the ambient environment.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. An interactive display table, comprising:
    (a) an interactive display housing;
    (b) a lamp housing disposed internal to the interactive display housing;
    (c) a thermally managed lamp disposed internal to the lamp housing, wherein:
        (i) the thermally managed lamp is defined by a main body portion coupled to a stem portion; and
        (ii) the stem portion is further defined by an electrical interface at a first end of the stem portion, a second end of the stem portion opposite the first end and being coupled to the main body portion;
    (d) a remote heat sink assembly thermally coupled to the interactive display housing, wherein the remote heat sink assembly includes a finned heat sink disposed of externally to the interactive display housing such that the finned heat sink is thermally coupled to an ambient environment outside of the interactive display housing; and
    (e) a heat pipe in thermal communication with the remote heat sink assembly and the stem portion of the thermally managed lamp and forming a closed loop there between, wherein the heat pipe is defined by a substantially hollow elongated member containing a thermally conductive fluid such that the thermally conductive fluid flows within the heat pipe by vaporizing in the heat sink adjacent to the thermally managed lamp and condensing in the remote heat sink assembly, thereby transferring heat by convective circulation from the thermally conductive lamp to the heat sink.

2. The interactive display of claim 1, and wherein the lamp housing is composed of a ceramic material.

3. The interactive display of claim 1, and wherein the lamp housing is composed of a composite material including at least one of
    (a) carbon fiber;
    (b) plastic;
    (c) glass fiber; and
    (d) polymer.

4. The interactive display of claim 1, further comprising a cooling fan disposed proximate to the lamp housing and configured for cooling the lamp by moving air past the lamp.

5. The interactive display of claim 1, and further comprising a thermally conductive gap filling material disposed proximate to the heat pipe and stem portion to facilitate heat conduction between the stem portion and the heat pipe.

6. The interactive display of claim 5, wherein the thermally conductive gap filling material includes at least one of:
    (a) a silicone elastomer;
    (b) a polymer;
    (b) ceramic particles;
    (c) aluminum;
    (d) fiberglass;
    (e) copper; and
    (f) graphite particles.

7. The interactive table of claim 1, wherein the heat pipe is composed of material including at least one of:
    (a) copper;
    (b) aluminum;
    (c) steel;
    (d) a carbon composite;
    (e) a ceramic; and
    (f) a polymer.

8. The interactive display of claim 1, wherein at least a portion of the heat pipe is substantially helically disposed about at least a portion of the stem portion of the lamp.

9. The interactive display of claim 1, wherein the heat pipe contains a thermally conductive fluid including at least one of:
    (a) water;
    (b) an alcohol;
    (c) toluene;
    (d) acetone;
    (e) a phenol;
    (f) ammonia; and
    (g) a halide salt.

10. The interactive display of claim 1, wherein the remote heat dissipation assembly includes at least one of:
    (a) a condenser;
    (b) a heat sink;
    (c) a heat exchanger; and
    (d) a fan.

11. An interactive display table that can be de- energized without continuing to provide moving air for cooling purposes to a light source contained therein, comprising:
    (a) an interactive display housing;
    (b) a lamp housing disposed internal to the interactive display housing;
    (c) a thermally managed lamp assembly disposed internal to the interactive display housing, the thermally managed lamp assembly consisting of:
        (i) a thermally managed lamp being defined by a main body portion coupled to a stem portion, wherein the stem portion is further defined by an electrical interface at a first end of the stem portion, a second end of the stem portion opposite the first end and being coupled to the main body portion, and the stem portion being in thermal communication with a heat pipe generally configured in a helical fashion around the stem portion;

(ii) a remote heat sink assembly thermally coupled to the interactive display housing, wherein the remote heat sink assembly includes a finned heat sink disposed of externally to the interactive display housing such that the finned heat sink is thermally coupled to an ambient environment outside of the interactive display housing; and (iii) the heat pipe in thermal communication with the remote heat sink assembly and the stem portion of the thermally managed lamp and forming a closed loop there between, wherein the heat pipe is defined by a substantially hollow elongated member containing a thermally conductive fluid such that the thermally conductive fluid flows within the heat pipe by vaporizing in the heat sink adjacent to the thermally managed lamp and condensing in the remote heat sink assembly, thereby transferring heat by convective circulation from the thermally conductive lamp to the heat sink without the need of an energized cooling mechanism.

12. The thermally stabilized lamp assembly of claim 11, further comprising a thermally conductive gap filling material disposed substantially between the arc lamp base and at least a portion of the heat pipe.

13. The thermally stabilized lamp assembly of claim 12, wherein the heat pipe is composed of material including at least one of:
(a) copper;
(b) aluminum;
(c) steel;
(d) a carbon composite;
(e) a ceramic; and
(f) a polymer.

14. The thermally stabilized lamp assembly of claim 11, wherein the heat dissipation assembly includes at least one of:

(a) a condenser;
(b) a finned heat sink; and
(c) a heat exchanger.

15. A method for enabling an illumination source contained in an interactive display table to be de-energized without providing moving air to cool the illumination source after it has been de-energized, comprising the steps of:
(a) providing a heat pipe in thermal communication with the illumination source, the heat pipe containing a heat conducting liquid that vaporizes in response to the heat of the illumination source;
(b) providing a heat sink in thermal communication with the heat pipe, wherein at least a portion of the heat sink extends outside the interactive display table such that the at least a portion of the heat sink is in thermal communication with ambient environment surrounding the interactive display table; and
(c) removing the heat from the illumination source to the ambient environment using heat convection by selecting a heat conducting liquid that vaporizes at a temperature proximate the operating temperature of the lamp and condenses when in thermal contact with the heat sink, thereby providing a convective current that transfers heat from the illumination source to the ambient environment without the use of any energized components.

16. The method of claim 15, further comprising the step of increasing thermal conductivity between the heat pipe and the illumination source with a thermally conductive gap filler that is disposed between the heat pipe and the illumination source.

17. The method of claim 15, further comprising the step of conveying the thermally conductive fluid to a remote heat dissipation device that is in thermal communication with the ambient environment.

18. The method of claim 15, further comprising the step of positioning the remote heat dissipation device so as to maximize thermal communication away from the illumination source and into the ambient environment.

* * * * *